(12) United States Patent
Shimazawa et al.

(10) Patent No.: US 6,982,855 B2
(45) Date of Patent: Jan. 3, 2006

(54) MAGNETORESISTIVE HEAD HAVING LAYER STRUCTURE BETWEEN FREE AND LEAD LAYERS WITH LAYER STRUCTURE INCLUDING FIXED MAGNETIZATION LAYER

(75) Inventors: Koji Shimazawa, Chuo-ku (JP);
Yoshihiro Tsuchiya, Chuo-ku (JP);
Koichi Terunuma, Chuo-ku (JP)

(73) Assignee: TDK Corporation, Tokyo (JP)

( * ) Notice: Subject to any disclaimer, the term of this patent is extended or adjusted under 35 U.S.C. 154(b) by 113 days.

(21) Appl. No.: 10/435,059

(22) Filed: May 12, 2003

(65) Prior Publication Data

US 2003/0218836 A1    Nov. 27, 2003

Related U.S. Application Data

(60) Provisional application No. 60/387,600, filed on Jun. 12, 2002.

(30) Foreign Application Priority Data

May 27, 2002    (JP)    ............................. 2002-152800

(51) Int. Cl.
*G11B 5/39* (2006.01)
(52) U.S. Cl. ............................................... 360/324.12
(58) Field of Classification Search ............ 360/324.12
See application file for complete search history.

(56) References Cited

U.S. PATENT DOCUMENTS

| | | | |
|---|---|---|---|
| 5,438,470 A | 8/1995 | Ravipati et al. | |
| 6,040,962 A | 3/2000 | Kanazawa et al. | |
| 6,141,190 A | 10/2000 | Nakamoto et al. | |
| 6,462,919 B1 * | 10/2002 | Mack et al. | 360/327.3 |
| 6,574,080 B1 * | 6/2003 | Sakaguci et al. | 360/327.32 |
| 6,807,033 B2 * | 10/2004 | Zhu | 360/324.12 |
| 2001/0033466 A1 * | 10/2001 | Ooshima et al. | 360/324.12 |
| 2002/0024781 A1 * | 2/2002 | Ooshima et al. | 360/324.12 |
| 2003/0156361 A1 * | 8/2003 | Li et al. | 360/324.12 |
| 2003/0167625 A1 * | 9/2003 | Li et al. | 360/324.12 |

FOREIGN PATENT DOCUMENTS

| | | |
|---|---|---|
| JP | A 8-45037 | 2/1996 |
| JP | A 9-282618 | 10/1997 |
| JP | A 11-31313 | 2/1999 |
| JP | A 2000-76629 | 3/2000 |
| JP | A 2001-176032 | 6/2001 |

* cited by examiner

*Primary Examiner*—Craig A. Renner
(74) *Attorney, Agent, or Firm*—Oliff & Berridge, PLC

(57) ABSTRACT

An MR element includes a free layer. Hard magnetic layers are placed on both sides of the MR element and apply a bias magnetic field to the free layer. A pair of electrode layers are placed as spaced from each other, and supplies a sense current to the free layer. Layer structures are placed between portions overlapping with the respective electrode layers in the ambilateral regions of the free layer, and the electrode layers. Each layer structure includes a nonmagnetic layer, a ferromagnetic layer, and an antiferromagnetic layer. A direction of magnetization of the ferromagnetic layer is fixed by the antiferromagnetic layer, and a magnetic thickness of the ferromagnetic layer is set greater than that of the free layer.

6 Claims, 7 Drawing Sheets

MAGNETORESISTIVE HEAD HAVING LAYER STRUCTURE BETWEEN FREE AND LEAD LAYERS WITH LAYER STRUCTURE INCLUDING FIXED MAGNETIZATION LAYER

CROSS-REFERENCE TO RELATED APPLICATIONS

This application claims the benefit of the claiming priority of U.S. Provisional application Ser. No. 60/387,600, filed on Jun. 12, 2002, which provisional application is incorporated by reference herein.

BACKGROUND OF THE INVENTION

1. Field of the Invention

The present invention relates to a thin film magnetic head, a thin film magnetic head assembly, a storage device, and a method of manufacturing a thin film magnetic head.

2. Related Background Art

With increase in density of magnetic recording media such as hard disk drive and the like, there are increasing demands for improvement in the performance of the thin film magnetic heads. The thin film magnetic heads include reproducing heads having a magnetoresistive element (hereinafter referred to as an MR (Magneto Resistive) element) for readout. The reproducing heads are required to have the property of low Barkhausen noise. In order to decrease the Barkhausen noise, there is a known technique of placing hard magnetic layers on the both sides of the MR element and applying a bias magnetic field to the MR element to bring a free layer in the MR element into the single domain structure.

Incidentally, when the hard magnetic layers are placed so as to sandwich the MR element (the free layer) between them, there appear regions where directions of magnetization are fixed by magnetic fields from the hard magnetic layers to disable detection of magnetic fields of signals (hereinafter referred to as dead zones), in the vicinity of end regions adjacent to the hard magnetic layers, in the MR element. For this reason, in the case where a pair of electrode layers for supplying an electric current (sense current) to the MR element are placed so as not to overlap with the MR element, the supplied current passes the dead zones, posing the problem of decrease in output from the reproducing head. In order to solve this problem, there is a known technique of placing the electrode layers so as to overlap in part with the MR element (e.g., reference is made to Japanese Patent Applications Laid-Open No. 08-45037, No. 09-282618, No. 11-31313, No. 2000-76629, and so on).

When the electrode layers are placed so as to overlap with the MR element, the current becomes reluctant to flow through the dead zones in the MR element and thus those zones do not contribute directly to the output of the reproducing head. However, since the regions of the MR element overlapping with the electrode layers absorb the magnetic field leaking from the magnetic recording medium, the absorbed magnetic field is transmitted up to the highly sensitive region in the central part of the track, thereby posing the problem of read blur to expand the effective track width. As a solution to this problem, Japanese Patent Application Laid-Open No. 2001-176032 discloses a technique of providing a portion of a magnetosensitive layer (free layer) antiferromagnetically exchange-coupled with a ferromagnetic metal layer through a metal layer to decrease the reproduction sensitivity of that portion.

SUMMARY OF THE INVENTION

In the thin film magnetic head of the structure provided with the ferromagnetic metal layer antiferromagnetically exchange-coupled through the metal layer with the portion of the free layer, however, it was found that with application of an external magnetic field the direction of magnetization of the portion antiferromagnetically exchange-coupled with the ferromagnetic metal layer in the free layer could be coincident with the direction of magnetization of the free layer in the track part and the problem of read blur to expand the effective track width was not solved yet.

In view of the foregoing, it is an object of the present invention to provide a thin film magnetic head capable of decreasing the read blur in the ambilateral regions of the free layer to suppress the expansion of the effective track width, a thin film magnetic head assembly and a storage device incorporating the thin film magnetic head, and a method of manufacturing a thin film magnetic head.

For achieving such an object, the present invention provides a thin film magnetic head comprising a magnetoresistive element incorporating a free layer an orientation of magnetization of which varies according to an external magnetic field, a pair of electrode layers placed so as to overlap with the free layer on both sides of the free layer and be spaced from each other, for supplying an electric current to the magnetoresistive element, and a layer structure placed between a portion overlapping with the electrode layer in each of ambilateral regions of the free layer, and the electrode layer, and where in the layer structure comprises an electrically conductive, ferromagnetic layer a direction of magnetization of which is fixed, an electrically conductive, nonmagnetic layer placed between the ferromagnetic layer and the free layer, and an electrically conductive, antiferromagnetic layer placed between the ferromagnetic layer and the electrode layer and fixing the direction of magnetization of the ferromagnetic layer, and a magnetic thickness of the ferromagnetic layer is set greater than a magnetic thickness of the free layer.

In the present invention, the ferromagnetic layer the direction of magnetization of which is fixed by the antiferromagnetic layer and the magnetic thickness of which is set greater than the magnetic thickness of the free layer, is placed between the portion overlapping with the electrode layer in each of the ambilateral regions of the free layer, and the electrode layer, so that with application of an external magnetic field, magnetization of the portion overlapping with the electrode layer in the free layer is directed in the direction opposite to magnetization of the free layer in the track part. This decreases the read blur in the ambilateral regions of the free layer, so as to suppress the expansion of the effective track width.

Preferably, in the present invention, the free layer and the ferromagnetic layer are made of a common material and a thickness of the ferromagnetic layer is set greater than a thickness of the free layer. In this case, it is feasible to readily realize the configuration wherein the magnetic thickness of the ferromagnetic layer is greater than the magnetic thickness of the free layer.

Preferably, in the present invention, the layer structure further comprises a fixed magnetization layer placed between the antiferromagnetic layer and the electrode layer and a direction of magnetization of which is fixed in a direction opposite to the direction of magnetization of the ferromagnetic layer. In this case, a closed magnetic field is readily formed between the ferromagnetic layer and the fixed magnetization layer, so as to keep down the influence of magnetic leakage from the ferromagnetic layer on the track part of the free layer. This prevents the magnetic leakage from the ferromagnetic layer from being absorbed by the track part of the free layer to become a noise component. As a result, the magnetic field leaking from the magnetic recording medium is properly detected at the track part of the free layer, so as to stabilize the reproduced output.

Preferably, in the present invention, the fixed magnetization layer includes a permanent magnet layer. In this case, it is feasible to simply and readily realize the configuration of the fixed magnetization layer capable of forming a closed magnetic field together with the ferromagnetic layer.

Preferably, in the present invention, the fixed magnetization layer includes an electrically conductive, ferromagnetic layer a direction of magnetization of which is fixed, and the layer structure is placed between the ferromagnetic layer included in the fixed magnetization layer, and the layer structure further comprises an electrically conductive, antiferromagnetic layer placed between the ferromagnetic layer included in the fixed magnetization layer, and the electrode layer and fixing the direction of magnetization of the ferromagnetic layer.

A thin film magnetic head assembly according to the present invention comprises the above-stated thin film magnetic head, and a flexible member to which the thin film magnetic head is attached.

In the thin film magnetic head assembly according to the present invention, since its thin film magnetic head is comprised of the aforementioned thin film magnetic head, the read blur is decreased in the ambilateral regions of the free layer, as described above.

A storage device according to the present invention comprises a magnetic recording medium for magnetically storing a signal, and the above-stated thin film magnetic head for converting a change of a magnetic field leaking from the magnetic recording medium, into an electric signal.

In the storage device according to the present invention, since its thin film magnetic head is comprised of the foregoing thin film magnetic head, the read blur is decreased in the ambilateral regions of the free layer, as described above.

A production method of a thin film magnetic head according to the present invention is a method of manufacturing a thin film magnetic head comprising a magnetoresistive element incorporating a free layer an orientation of magnetization of which varies according to an external magnetic field, the method comprising: a step of successively stacking an electrically conductive, nonmagnetic layer, an electrically conductive, ferromagnetic layer, and an electrically conductive, antiferromagnetic layer on the magnetoresistive element to form a layer structure; a step of forming a resist layer in a desired pattern on the layer structure; a step of forming a metal layer on the layer structure, using the resist layer as a mask; a step of removing the resist layer; and a step of removing a portion of the layer structure so as to leave the nonmagnetic layer, using the metal layer as a mask.

In the production method of the thin film magnetic head according to the present invention, the free layer is formed including a portion with the layer structure thereon and a portion without the layer structure. With application of an external magnetic field, magnetization of the portion with the layer structure thereon in the free layer is oriented in the direction opposite to magnetization of the portion without the layer structure in the free layer (the portion corresponding to the track part of the free layer). This results in decreasing the read blur in the portion with the layer structure thereon in the free layer, so as to suppress the expansion of the effective track width. Since part of the layer structure is removed so as to leave the nonmagnetic layer, it is also feasible to protect the free layer by the nonmagnetic layer.

In the production method of the thin film magnetic head according to the present invention, preferably, the step of forming the layer structure comprises a step of further laying a permanent magnet layer on the antiferromagnetic layer. In this case, it is feasible to simply and readily realize the configuration capable of forming a closed magnetic field together with the ferromagnetic layer included in the layer structure.

A production method of a thin film magnetic head according to the present invention is a method of manufacturing a thin film magnetic head comprising a magnetoresistive element incorporating a free layer an orientation of magnetization of which varies according to an external magnetic field, the method comprising: a step of successively stacking an electrically conductive, nonmagnetic layer and an electrically conductive, ferromagnetic layer on the magnetoresistive element to form a first layer structure; a step of forming a resist layer in a desired pattern on the ferromagnetic layer; a step of laying at least an electrically conductive, antiferromagnetic layer on the ferromagnetic layer, using the resist layer as a mask, to form a second layer structure; a step of forming a metal layer on the second layer structure, using the resist layer as a mask; a step of removing the resist layer; and a step of removing the ferromagnetic layer so as to leave the nonmagnetic layer, using the metal layer as a mask.

In the production method of the thin film magnetic head according to the present invention, the free layer is formed including a portion with the first and second layer structures thereon and a portion without the first and second layer structures. With application of an external magnetic field, magnetization of the portion with the first and second layer structures thereon in the free layer is oriented in the direction opposite to magnetization of the portion without the first and second layer structures in the free layer (the portion corresponding to the track part of the free layer). This results in decreasing the read blur in the portion with the first and second layer structures thereon in the free layer, so as to suppress the expansion of the effective track width. Since the ferromagnetic layer is removed so as to leave the nonmagnetic layer, it is also feasible to protect the free layer by the nonmagnetic layer.

In the production method of the thin film magnetic head according to the present invention, preferably, the step of forming the second layer structure comprises a step of further laying a permanent magnet layer on the antiferromagnetic layer. In this case, it is feasible to simply and readily realize the configuration capable of forming a closed magnetic field together with the ferromagnetic layer included in the first layer structure.

In the present specification, the magnetic thickness refers to a magnetic charge per unit area that a thin film of a thickness t(m) has, and is defined by Eq (1) below.

$$\text{Magnetic thickness } (A) = Ms^* \times t \quad (1)$$

$Ms^*$: saturation magnetization (A/m)

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The thin film magnetic head, the thin film magnetic head assembly, the storage device, and the production method of the thin film magnetic head according to each of embodiments of the present invention will be described below with reference to the drawings. In the description, the same elements or elements with the same functions will be denoted by the same reference symbols, and redundant description will be omitted. FIG. 1 to FIG. 3, FIGS. 6A to 6E, and FIGS. 7A to 7E are illustrated without hatching for cross sections. The terms "upper" and "lower" will follow the upper and lower positions in FIGS. 1 to 3, FIGS. 6A to 6E, and FIGS. 7A to 7E.

(First Embodiment)

Figure 1:
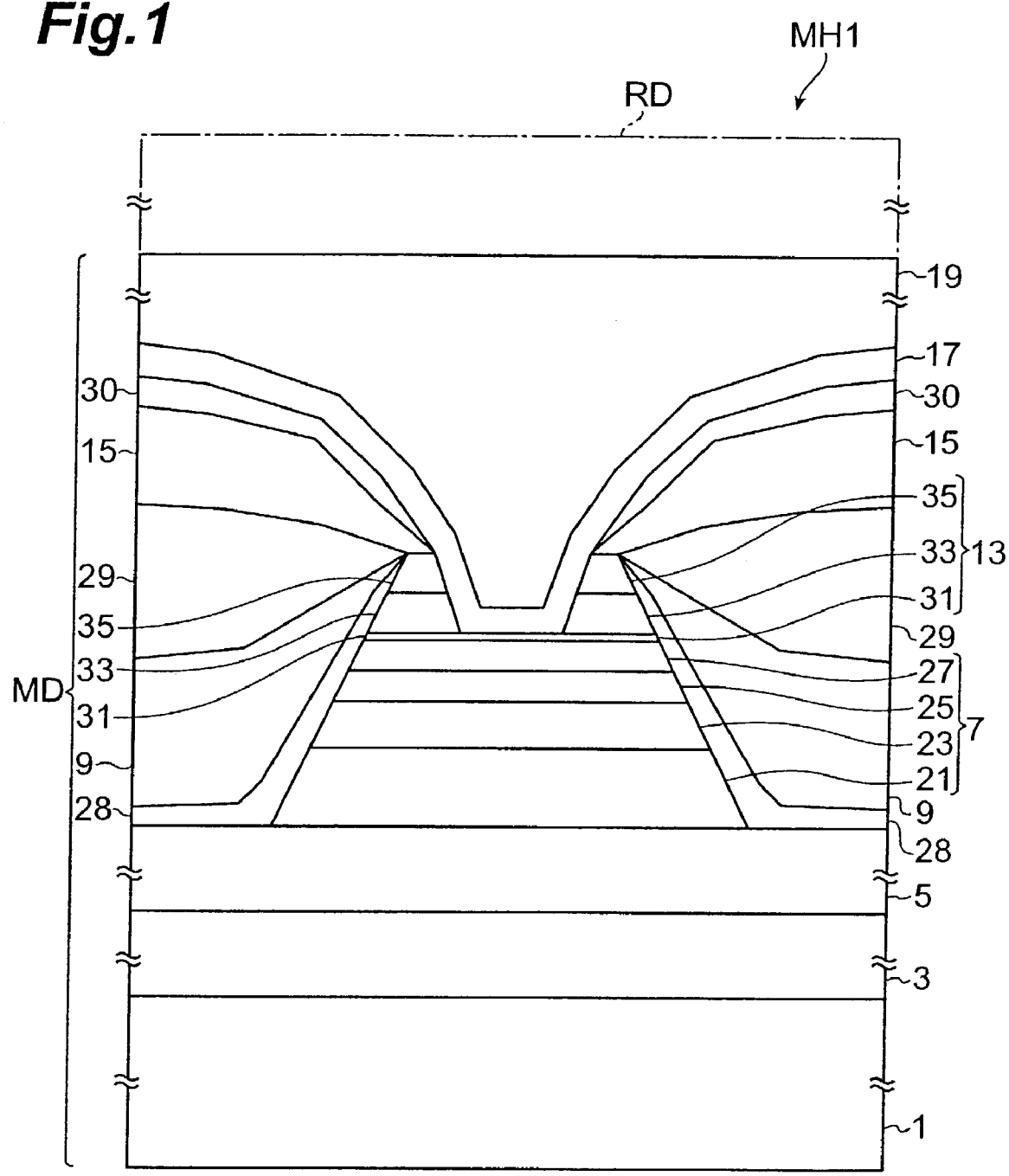
FIG. 1 is a schematic illustration for explaining the sectional structure of the thin film magnetic head according to the first embodiment.

FIG. 1 is a schematic illustration for explaining the sectional structure of the thin film magnetic head MH1. The thin film magnetic head MH1 is comprised of a magnetic detector element MD as a reproducing head and a magnetic field forming element RD as a recording head. The magnetic detector element MD is composed of a nonmagnetic substrate 1, a lower magnetic shield layer 3, a lower gap layer 5, an MR element 7, hard magnetic layers 9, layer structures 13, electrode layers 15, an upper gap layer 17, an upper magnetic shield layer 19, and so on.

The nonmagnetic substrate 1 is made of a material of $Al_2O_3 \cdot TiC$ or the like. The lower magnetic shield layer 3 is made of a soft magnetic material such as NiFe, sendust, FeCo, FeCoNi, or the like, and formed on the nonmagnetic substrate 1. The thickness of the lower magnetic shield layer 3 is set in the range of 0.5 $\mu$m to 4 $\mu$m. The lower gap layer 5 is made of a nonmagnetic insulator such as $Al_2O_3$, AlN, $SiO_2$, or the like and formed on the lower magnetic shield layer 3. The thickness of the lower gap layer 5 is set in the range of 5 nm to 30 nm.

The MR element 7 is a GMR (Giant Magneto Resistive) element and includes a pinning layer (antiferromagnetic layer) 21, a pinned layer (fixed magnetization layer) 23, a nonmagnetic layer 25, and a free layer 27. This MR element 7 can be constructed by successively stacking thin films of the pinning layer 21, pinned layer 23, nonmagnetic layer 25, and free layer 27 on the lower gap layer 5 and patterning them (available techniques for which include ion milling, RIE, and so on). Exchange coupling occurs at the interface between the pinning layer 21 and the pinned layer 23, whereby the orientation of magnetization of the pinned layer 23 is fixed in a definite direction (a direction perpendicular to the direction of the track width). On the other hand, the free layer 27 changes the orientation of magnetization thereof according to the magnetic field leaking from the magnetic recording medium, i.e., according to the external magnetic field.

The pinning layer 21 is made of an antiferromagnetic material such as PtMn, NiO, or the like and formed on the lower gap layer 5. The thickness of the pinning layer 21 is set in the range of 3 nm to 50 nm. The pinned layer 23 is made of a ferromagnetic material such as Fe, Co, Ni, NiFe, CoFe, CoZrNb, FeCoNi, or the like and formed on the pinning layer 21. The thickness of the pinned layer 23 is set in the range of 0.5 nm to 5 nm. The nonmagnetic layer 25 is made of a nonmagnetic material such as Cu, Ru, Rh, Ir, Au, Ag, or the like and formed on the pinned layer 23. The thickness of the nonmagnetic layer 25 is set in the range of 1 nm to 4 nm. The free layer 27 is made of a ferromagnetic material such as Fe, Co, Ni, NiFe, CoFe, CoZrNb, FeCoNi, or the like and formed on the nonmagnetic layer 25. The thickness of the free layer 27 is set in the range of 0.5 nm to 10 nm.

The hard magnetic layers 9 are placed on the both sides of the MR element 7 and apply a bias magnetic field to the free layer 27. The orientation of magnetization of the free layer 27 is aligned with a direction parallel to the track width direction by the bias magnetic field from the hard magnetic layers 9 and is the direction perpendicular to the orientation of magnetization of the pinned layer 23. The hard magnetic layers 9 are made of a hard magnetic material with a high coercive force such as CoCrPt, CoPt, CoTa, or the like and provided through an underlying layer 28 on the both sides of the MR element 7. The underlying layers 28 are made of a metal material such as TiW, Ta, CrTi, or the like and formed on the side regions of the MR element 7 and on the lower gap layer 5. The underlying layers 28 and the hard magnetic layers 9 are formed after film formation of the layer structures 13. The spacing between the hard magnetic layers 9 is set at about 0.5 μm at the narrowest position. Protective layers 29 are formed on the hard magnetic layers 9 and the protective layers 29 are made of Ta, $Al_2O_3$, or the like.

The layer structures 13 are placed between portions overlapping with the respective electrode layers 15 in ambilateral regions of the free layer 27, and the electrode layers 15, and each layer structure 13 includes a nonmagnetic layer 31, a ferromagnetic layer 33, and an antiferromagnetic layer 35.

The nonmagnetic layer 31 is made of an electrically conductive, nonmagnetic material such as Cu, Ru, Rh, Ir, Ta, Au, Ag, or the like and is placed between the free layer 27 and the ferromagnetic layers 33. The thickness of the nonmagnetic layer 31 is set in the range of 0.3 nm to 2 nm. In the present embodiment, the nonmagnetic layer 31 is deposited over the whole of the free layer 27 and is thus formed on the free layer 27 in the track part as well.

A pair of ferromagnetic layers 33 are placed in the ambilateral regions of the free layer 27. The ferromagnetic layers 33 are made of an electrically conductive, ferromagnetic material such as Fe, Co, Ni, NiFe, CoFe, FeTa, or the like and formed by depositing a film of the material on the nonmagnetic layer 31 and then patterning it (available techniques for which include ion milling, RIE (Reactive Ion Etching), and so on). The thickness of the ferromagnetic layers 33 is set in the range of 1 nm to 4 nm. The spacing between the pair of ferromagnetic layers 33 is set at about 0.1 μm at the narrowest position. The nonmagnetic layer 31 also has a function of protecting the free layer 27 during the patterning of the ferromagnetic layers 33 and others.

Here the magnetic thickness of the ferromagnetic layers 33 is set greater than the magnetic thickness of the free layer 27. For example, in the case where the free layer 27 is $Co_{90}Fe_{10}$ (saturation magnetization Ms*: 1512 kA/m) and the thickness t is set at 20 nm, the magnetic thickness of the free layer 27 becomes 30.24 mA. On the other hand, in the case where the ferromagnetic layers 33 are $Co_{90}Fe_{10}$, if the thickness t of the ferromagnetic layers 33 is set greater than 20 nm, the magnetic thickness of the ferromagnetic layers 33 becomes greater than 30.24 mA and thus greater than the magnetic thickness of the free layer 27. In the case where the ferromagnetic layers 33 are FeTa (saturation magnetization Ms*: $1.512 \times 10^6$ A/m), if the thickness t of the ferromagnetic layers 33 is set greater than 20 nm, the magnetic thickness of the ferromagnetic layers 33 becomes greater than 30.24 mA and thus greater than the magnetic thickness of the free layer 27 of $Co_{90}Fe_{10}$. The saturation magnetization of Fe is 1714 kA/m, the saturation magnetization of Co 1422 kA/m, the saturation magnetization of Ni 484 kA/m, and the saturation magnetization of $Ni_{80}Fe_{20}$ 796 kA/m.

A pair of antiferromagnetic layers 35 are placed between the ferromagnetic layers 33 and the electrode layers 15 and located in the ambilateral regions of the free layer 27. The antiferromagnetic layers 35 are made of an electrically conductive, antiferromagnetic material such as IrMn, PtMn, NiO, RuRhMh, or the like and formed by depositing a film of the material on the ferromagnetic layer 33 and patterning it (available techniques for which include ion milling, RIE, and so on). The direction of magnetization of the ferromagnetic layers 33 is fixed by the antiferromagnetic layers 35.

The thickness of the antiferromagnetic layers 35 is set in the range of 2 nm to 30 nm. The spacing between the pair of antiferromagnetic layers 35 is set at about 0.1 μm at the narrowest position.

The electrode layers 15 are placed so as to overlap with the free layer 27 and be spaced from each other on the both sides of the free layer 27, and supply an electric current (sense current) to the free layer 27. The electrode layers 15 are made of an electrically conductive material of Au, Ag, or the like and formed on the layer structures 13 and on the protective layers 29. Protective layers 30 are deposited on the electrode layers 15 and the protective layers 30 are made of Ta, $Al_2O_3$, or the like. Electrons supplied from one electrode layer 15 are transmitted through one layer structure 13, the free layer 27, and the other layer structure 13 to the other electrode layer 15. An electric current flows in the opposite direction to the electrons. The spacing between the pair of electrode layers 15 is set at about 0.1 μm at the narrowest position and is smaller than the spacing between the hard magnetic layers 9.

Portions of the free layer 27 overlap with the electrode layers 15 in the ambilateral regions of the free layer 27, and the layer structures 13 (nonmagnetic layer 31, ferromagnetic layers 33, and antiferromagnetic layers 35) are placed between the portions overlapping with the respective electrode layers 15 in the ambilateral regions of the free layer 27, and the electrode layers 15. The portion not overlapping with the electrode layers 15 in the free layer 27 functions as the track part. The optical track width is thus set at about 0.1 μm.

The upper gap layer 17 is made of a nonmagnetic insulator such as $Al_2O_3$, AlN, $SiO_2$, or the like and formed on the protective layers 30 and on the nonmagnetic layer 31. The thickness of the upper gap layer 17 is set in the range of 5 nm to 30 nm. The upper magnetic shield layer 19 is made of a soft magnetic material such as NiFe, sendust, FeCo, FeCoNi, or the like and formed on the upper gap layer 17. The thickness of the upper magnetic shield layer 19 is set in the range of 0.5 μm to 4 μm. Since each of the shield layers 3, 19 is made of the soft magnetic material, they prevent magnetic leakage except for a magnetic field leaking from a magnetization transition area as a detected object, from entering the interior of the MR element 7.

The terms "soft magnetic" and "hard magnetic" stated above define levels of coercivity, and they allow presence of a material or a structure outside the definition, for example, in a microscopic or specific region as long as the "soft magnetic" and "hard magnetic" properties are ensured as a whole. For example, it is possible to employ a combination of materials with different magnetic characteristics magnetically exchange-coupled, or a material containing a nonmagnetic material in part as long as the soft magnetic and hard magnetic properties are ensured as a whole.

The function of the thin film magnetic head MH1 will be described below. The free layer 27 is maintained into the single domain structure in the track width direction by the hard magnetic layers 9. The orientation of magnetization of the free layer 27 varies depending upon leakage magnetic fields from magnetization transition areas, i.e., depending upon whether a magnetization transition area is the pole N or the pole S. Since the orientation of magnetization of the pinned layer 23 is fixed by the pinning layer 21, the transmissibility of electrons (current) between the pair of electrode layers 15 varies depending upon change of resistance according to the cosine of the angle between the directions of magnetization of the free layer 27 and the pinned layer 23. A leakage magnetic field from a magnetization transition area as a detected object of the magnetic recording medium can be detected by detecting a change of the current. The magnetic field can also be detected by detecting a voltage while keeping the supply current (sense current) constant, and the detection of this type is used in general.

Some description will also be given below about magnetic recording of data. The magnetic field forming element RD for writing of magnetic data is mechanically coupled on the magnetic detector element MD of the thin film magnetic head MH1. Writing of data into the magnetization transition areas of the magnetic recording medium is implemented by leakage magnetic fields from the magnetic field forming element RD.

According to the present first embodiment, as described above, the ferromagnetic layers 33 the direction of magnetization of which is fixed by the antiferromagnetic layers 35 and the magnetic thickness of which is set greater than the magnetic thickness of the free layer 27, are placed between the portions overlapping with the electrode layers 15 in the ambilateral regions of the free layer 27, and the electrode layers 15, so that with application of an external magnetic field the magnetization of the portions overlapping with the electrode layers 15 in the free layer 27 is oriented in the direction opposite to the magnetization of the free layer 27 in the track part. This results in decreasing the read blur in the ambilateral regions of the free layer 27, so as to suppress the expansion of the effective track width.

In the present first embodiment, the free layer 27 and the ferromagnetic layers 33 are made of the same material and the thickness of the ferromagnetic layers 33 is set greater than the thickness of the free layer 27. This makes it feasible to readily realize the configuration wherein the magnetic thickness of the ferromagnetic layers 33 is greater than the magnetic thickness of the free layer 27.

(Second Embodiment)

Figure 2:
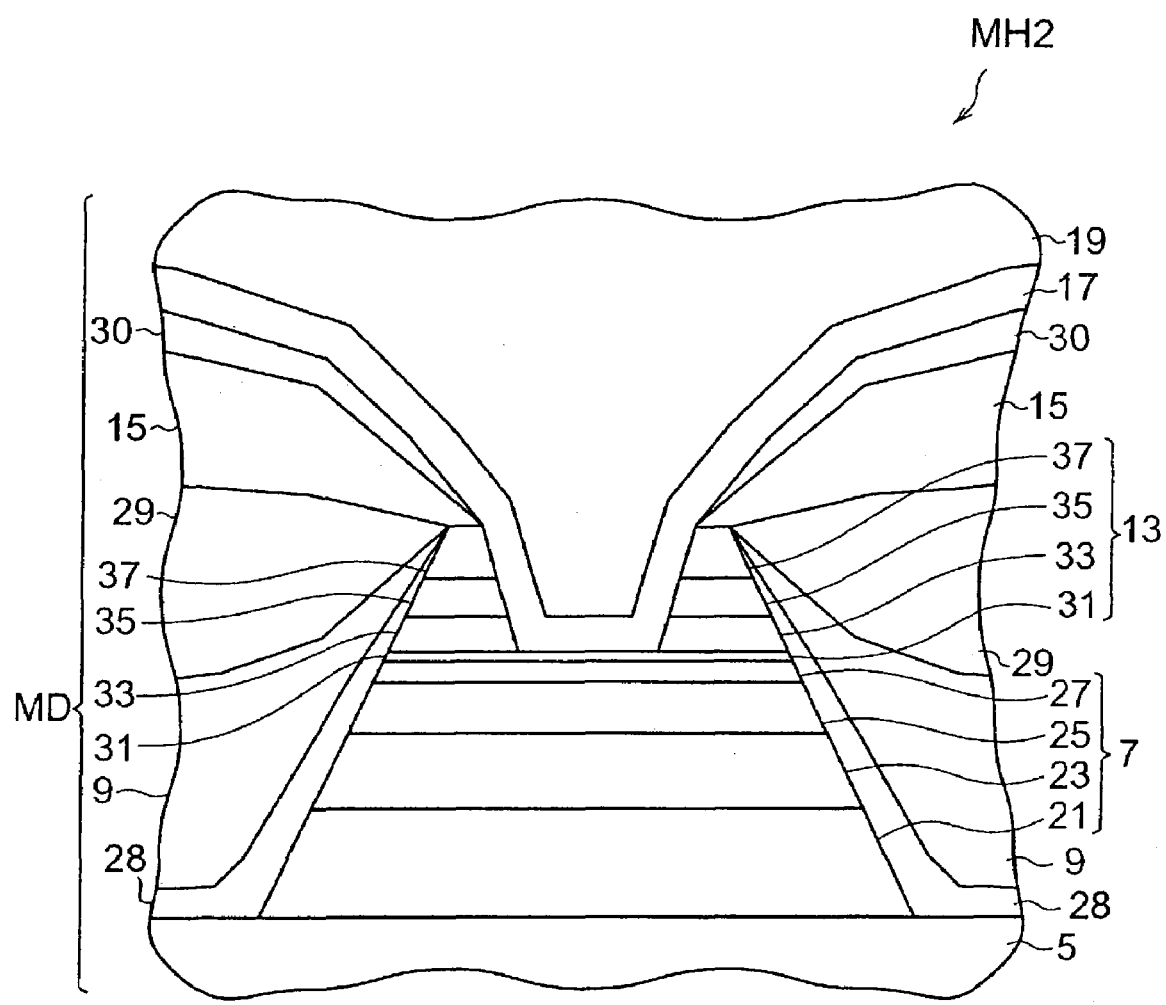
FIG. 2 is an enlarged schematic illustration of major part for explaining the sectional structure of the thin film magnetic head according to the second embodiment.

FIG. 2 is an enlarged schematic illustration of major part for explaining the sectional structure of the thin film magnetic head MH2. The thin film magnetic head MH2 is different from the thin film magnetic head MH1 in that each layer structure 13 further includes a permanent magnet layer (fixed magnetization layer).

Each layer structure 13 includes a nonmagnetic layer 31, a ferromagnetic layer 33, an antiferromagnetic layer 35, and a permanent magnet layer 37. The permanent magnet layer 37 is placed between the antiferromagnetic layer 35 and the electrode layer 15 and a pair of permanent magnet layers 37 are placed in the ambilateral regions of the free layer 27. The permanent magnet layers 37 are made of an electrically conductive, antiferromagnetic material such as CoCr, CoCrTa, CoCrTaPt, CoCrPt, CoNiPt, CoNiCr, CoPt, CoTa, or the like, and the direction of magnetization thereof is fixed in the direction opposite to the direction of magnetization of the ferromagnetic layers 33. The thickness of the permanent magnet layers 37 is set in the range of 5 nm to 100 nm. The spacing between the pair of permanent magnet layers 37 is set at about 0.1 $\mu$m at the narrowest position. The permanent magnet layers 37 can be formed by depositing a film of the material on the antiferromagnetic layer 35 and patterning it (available techniques for which include ion milling, RIE, and so on).

According to the present second embodiment, as described above, the ferromagnetic layers 33 the direction of magnetization of which is fixed by the antiferromagnetic layers 35 and the magnetic thickness of which is set greater than the magnetic thickness of the free layer 27, are placed between the portions overlapping with the electrode layers 15 in the ambilateral regions of the free layer 27, and the electrode layers 15, so that the read blur is reduced in the ambilateral regions of the free layer 27, so as to suppress the expansion of the effective track width, as in the first embodiment described above.

In the present second embodiment, each layer structure 13 further includes the permanent magnet layer 37 which is placed between the antiferromagnetic layer 35 and the electrode layer 15 and the direction of magnetization of which is fixed in the direction opposite to the direction of magnetization of the ferromagnetic layer 33.

This facilitates formation of a closed magnetic field between the ferromagnetic layer 33 and the permanent magnet layer 37, which keeps down the influence of the magnetic leakage from the ferromagnetic layers 33 on the track part of the free layer 27. This prevents the magnetic leakage from the ferromagnetic layers 33 from being absorbed by the track part of the free layer 27 to become a noise component. As a result, it becomes feasible to properly detect the magnetic field leaking from the magnetic recording medium, at the track part of the free layer 27 and to stabilize the reproduced output. It is also feasible to simply and easily realize the configuration capable of forming a closed magnetic field together with the ferromagnetic layer 33.

(Third Embodiment)

Figure 3:
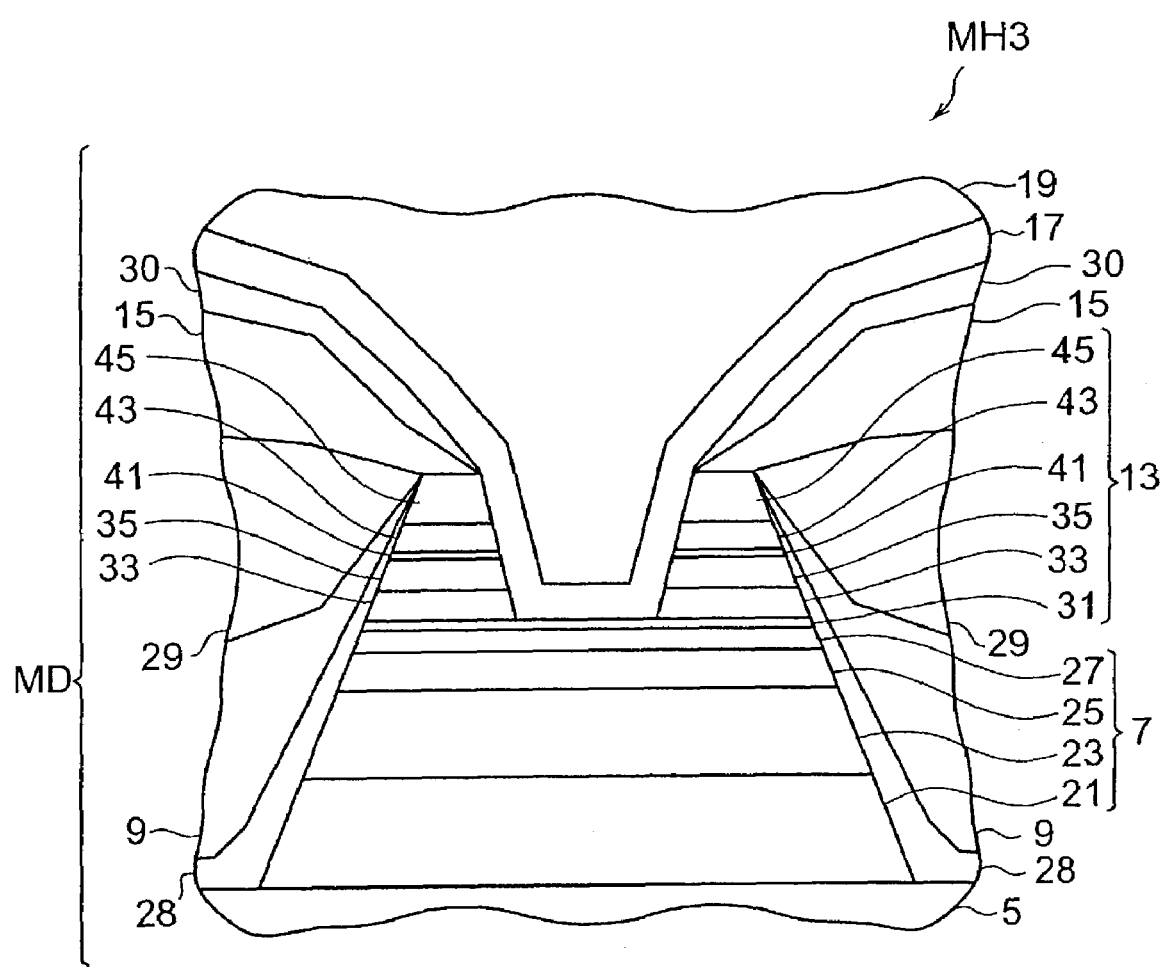
FIG. 3 is an enlarged schematic illustration of major part for explaining the sectional structure of the thin film magnetic head according to the third embodiment.

FIG. 3 is an enlarged schematic illustration of major part for explaining the sectional structure of the thin film magnetic head MH3. The thin film magnetic head MH3 is different from the thin film magnetic head MH1 mainly in that each layer structure 13 further includes a ferromagnetic layer (fixed magnetization layer).

Each layer structure 13 includes a nonmagnetic layer 31, a first ferromagnetic layer 33 (equivalent to the ferromagnetic layer 33 in the first and second embodiments), a first antiferromagnetic layer 35 (equivalent to the antiferromagnetic layer 35 in the first and second embodiments), a nonmagnetic layer 41, a second ferromagnetic layer 43, and a second antiferromagnetic layer 45.

The nonmagnetic layer 41 is placed between the second ferromagnetic layer 43 and the first antiferromagnetic layer 35, and a pair of nonmagnetic layers 41 are placed in the ambilateral regions of the free layer 27. The thickness of the nonmagnetic layers 31 is set in the range of 0.3 nm to 2 nm. The nonmagnetic layers 41 are made of an electrically conductive, nonmagnetic material such as Ta, Cu, Ru, Rh, Ir, Au, Ag, or the like and the thickness thereof is set in the range of 0.3 nm to 2 nm. The nonmagnetic layers 41 can be formed by depositing a film of the material on the first antiferromagnetic layer 35 and then patterning it (available techniques for which include ion milling, RIE, and so on). The nonmagnetic layer 41 shuts off the exchange coupling force between the second ferromagnetic layer 43 and the first antiferromagnetic layer 35. Therefore, instead of the provision of the nonmagnetic layers 41, it is also possible to shut off the exchange coupling force between the second ferromagnetic layer 43 and the first antiferromagnetic layer 35, by roughening the interface between the second ferromagnetic layer 43 and the first antiferromagnetic layer 35.

Each second ferromagnetic layer 43 is placed between the nonmagnetic layer 41 and the second antiferromagnetic layer 45, and a pair of second ferromagnetic layers 43 are placed in the ambilateral regions of the free layer 27. The second ferromagnetic layers 43 are made of an electrically conductive, ferromagnetic material such as Fe, Co, Ni, NiFe, CoFe, FeTa, or the like and formed by depositing a film of the material on the nonmagnetic layer 41 and then patterning it (available techniques for which include ion milling, RIE, and so on). The thickness of the second ferromagnetic layers 43 is set in the range of 1 nm to 4 nm. The spacing between the pair of second ferromagnetic layers 43 is set at about 0.1 μm at the narrowest position.

Each second antiferromagnetic layer 45 is placed between the second ferromagnetic layer 43 and the electrode layer 15, and a pair of second antiferromagnetic layers 45 are placed in the ambilateral regions of the free layer 27. The second antiferromagnetic layers 45 are made of an electrically conductive, antiferromagnetic material and formed by depositing a film of the material on the second ferromagnetic layer 43 and then patterning it (available techniques for which include ion milling, RIE, and so on). The direction of magnetization of the second ferromagnetic layers 43 is fixed in the direction opposite to that of the first ferromagnetic layers 33 by the second antiferromagnetic layers 45. The thickness of the second antiferromagnetic layers 45 is set in the range of 2 nm to 30 nm. The spacing between the pair of second antiferromagnetic layers 45 is set at about 0.1 μm at the narrowest position.

In order to make the direction of magnetization of the first ferromagnetic layers 33 opposite to the direction of magnetization of the second ferromagnetic layers 43, it is preferable to use materials with different Néel temperatures for the first antiferromagnetic layers 35 and for the second antiferromagnetic layers 45 from manufacturing requirements. In the case where the Néel temperature of the material used for the first antiferromagnetic layers 35 is lower than that of the material used for the second antiferromagnetic layers 45, the procedure of fixing the directions of magnetization of the first ferromagnetic layers 33 and the second ferromagnetic layers 43 is as follows.

First, in the stacked state of the first ferromagnetic layers 33, the first antiferromagnetic layers 35, the second ferromagnetic layers 43, and the second antiferromagnetic layers 45, the first ferromagnetic layers 33, first antiferromagnetic layers 35, second ferromagnetic layers 43, and second antiferromagnetic layers 45 are heated up to a temperature higher than the Néel temperatures of the material of the first antiferromagnetic layers 35 and the material of the second antiferromagnetic layers 45. Then, in a state in which a magnetic field is applied in a first direction, the first ferromagnetic layers 33, first antiferromagnetic layers 35, second ferromagnetic layers 43, and second antiferromagnetic layers 45 are cooled down to a temperature lower than the Néel temperature of the material of the second antiferromagnetic layers 45 and higher than the Néel temperature of the material of the first antiferromagnetic layers 35. This results in fixing the direction of magnetization of the second ferromagnetic layers 43.

Thereafter, in a state in which a magnetic field is applied in a second direction opposite to the first direction, the temperature is decreased to a temperature lower than the Néel temperature of the material of the first antiferromagnetic layers 35. This results in fixing the direction of magnetization of the first ferromagnetic layers 33.

In the case where the Néel temperature of the material of the first antiferromagnetic layers 35 is higher than the Néel temperature of the material of the second antiferromagnetic layers 45, the magnetization fixing procedure is reverse to the above-stated procedure; the direction of magnetization of the first ferromagnetic layers 33 is first fixed and thereafter the direction of magnetization of the second ferromagnetic layers 43 is fixed.

The first antiferromagnetic layers 35 can be made, for example, of one selected from materials with the Néel temperature lower than 300° C., such as FeMn (Néel temperature: 150° C.–200° C.), IrMn (Néel temperature: 200° C.–250° C.), RuRhMn (Néel temperature: 200° C.–250° C.), and so on, and the second antiferromagnetic layers 45 can be made, for example, of one selected from materials with the Néel temperature higher than 300° C., such as PtMn (Néel temperature: 320° C. approx.), NiMn (Néel temperature: 350° C. approx.), and so on.

According to the present third embodiment, as described above, the first ferromagnetic layers 33 the direction of magnetization of which is fixed by the first antiferromagnetic layers 35 and the magnetic thickness of which is set greater than that of the free layer 27, are placed between the portions overlapping with the electrode layers 15 in the ambilateral regions of the free layer 27, and the electrode layers 15, so that it is feasible to decrease the read blur in the ambilateral regions of the free layer 27 to suppress the expansion of the effective track width, as in the first and second embodiments described above.

In the present third embodiment, each layer structure 13 further includes the second ferromagnetic layer 43 which is placed between the first antiferromagnetic layer 35 and the electrode layer 15 and the direction of magnetization of which is fixed in the direction opposite to the direction of magnetization of the first ferromagnetic layer 33 by the second antiferromagnetic layer 45. This facilitates formation of a closed magnetic field between the first ferromagnetic layer 33 and the second ferromagnetic layer 43 and keep down the influence of the magnetic leakage from the first ferromagnetic layer 33 on the track part of the free layer 27. This prevents the magnetic leakage from the first ferromagnetic layer 33 from being absorbed by the track part of the free layer 27 to become a noise component. As a result, it is feasible to properly detect the magnetic field leaking from the magnetic recording medium at the track part of the free layer 27 and to stabilize the reproduced output.

Tests were conducted to verify the effect of suppressing the expansion of the effective track width in the thin film magnetic heads of the present invention. The tests were measurements of an optical track width and an effective track width for each of Example 1, and Comparative Examples 1 and 2 below. The optical track width was measured with a scanning electron microscope (SEM) The effective track width is defined as a width of a track profile at a position 6 dB below from a peak thereof. The track profiles were obtained in such a way that a signal was recorded in a narrow region of a predetermined track width (e.g., approximately 0.05 μm) in a magnetic recording medium and this signal recorded portion was moved in the track width direction relative to the magnetic detector element (MR element). In Example 1 and Comparative Examples 1 and 2, the configuration of the MR element and others was NiCr50/PtMn130/CoFe18/Ru8/CoFe18/Cu18/CoFe20/Ru5 (units of numerals: Å).

EXAMPLE 1

The configuration of the layer structures is CoFe33/IrMn50 (units of numerals: Å). Example 1 corresponds to the aforementioned configuration of the first embodiment.

The measurement results are presented in Table 1.

TABLE 1

| OPTICAL TRACK WIDTH (μm) | EFFECTIVE TRACK WIDTH (μm) | (OPTICAL TRACK WIDTH) − (EFFECTIVE TRACK WIDTH) (μm) |
| --- | --- | --- |
| 0.502 | 0.463 | 0.039 |
| 0.453 | 0.409 | 0.044 |
| 0.402 | 0.384 | 0.018 |

TABLE 1-continued

| OPTICAL TRACK WIDTH (μm) | EFFECTIVE TRACK WIDTH (μm) | (OPTICAL TRACK WIDTH) − (EFFECTIVE TRACK WIDTH) (μm) |
|---|---|---|
| 0.366 | 0.346 | 0.02 |
| 0.289 | 0.289 | 0 |
| 0.241 | 0.237 | 0.004 |
| 0.205 | 0.205 | 0 |
| 0.154 | 0.164 | −0.01 |
| 0.107 | 0.132 | −0.025 |
| 0.061 | 0.094 | −0.033 |

COMPARATIVE EXAMPLE 1

Comparative Example 1 is a configuration without the layer structures.
The measurement results are presented in Table 2.

TABLE 2

| OPTICAL TRACK WIDTH (μm) | EFFECTIVE TRACK WIDTH (μm) | (OPTICAL TRACK WIDTH) − (EFFECTIVE TRACK WIDTH) (μm) |
|---|---|---|
| 0.510 | 0.487 | 0.023 |
| 0.442 | 0.418 | 0.024 |
| 0.411 | 0.401 | 0.01 |
| 0.347 | 0.346 | 0.001 |
| 0.298 | 0.311 | −0.013 |
| 0.262 | 0.277 | −0.015 |
| 0.218 | 0.241 | −0.023 |
| 0.147 | 0.205 | −0.058 |
| 0.098 | 0.189 | −0.091 |
| 0.047 | 0.175 | −0.128 |

COMPARATIVE EXAMPLE 2

The configuration of the layer structures is CoFe15/IrMn50 (units of numerals: Å). Comparative Example 2 corresponds to the aforementioned configuration of the first embodiment, but the magnetic thickness of the ferromagnetic layers included in the layer structures is set smaller than the magnetic thickness of the free layer.
The measurement results are presented in Table 3.

TABLE 3

| OPTICAL TRACK WIDTH (μm) | EFFECTIVE TRACK WIDTH (μm) | (OPTICAL TRACK WIDTH) − (EFFECTIVE TRACK WIDTH) (μm) |
|---|---|---|
| 0.502 | 0.477 | 0.025 |
| 0.453 | 0.415 | 0.038 |
| 0.402 | 0.395 | 0.007 |
| 0.366 | 0.355 | 0.011 |
| 0.289 | 0.298 | −0.009 |
| 0.241 | 0.253 | −0.012 |
| 0.205 | 0.223 | −0.018 |
| 0.154 | 0.193 | −0.039 |
| 0.107 | 0.168 | −0.061 |
| 0.061 | 0.153 | −0.092 |

As apparent from the above measurement results, the read blur appears prominent in the range of the optical track width of smaller than 0.2 μm in Comparative Example 1. As seen from comparison between Example 1 and Comparative Example 2, the effective track width is narrower in Example 1 even in comparison at identical optical track widths. The above results verified the validity of the present invention.

The following will describe a thin film magnetic head assembly HGA using one of the above-stated thin film magnetic heads MH1 to MH3.

Figure 4:
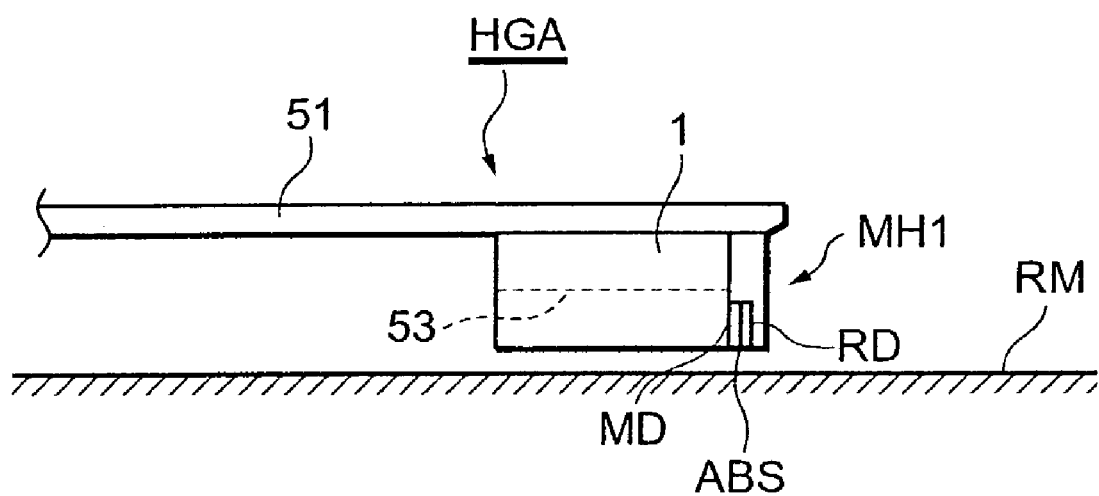
FIG. 4 is a side view of major part of the thin film magnetic head assembly.

FIG. 4 is a side view of major part of the thin film magnetic head assembly HGA. The thin film magnetic head assembly HGA has the aforementioned thin film magnetic head MH1 of the first embodiment as a thin film magnetic head. It is a matter of course that the thin film magnetic head MH1 of the first embodiment may be replaced by the thin film magnetic head MH2 of the second embodiment or the thin film magnetic head MH3 of the third embodiment.

This thin film magnetic head assembly HGA is provided with a flexible member 51, in addition to the thin film magnetic head MH1. The flexible member 51 can be bent within a plane including its longitudinal direction and direction of thickness. The thin film magnetic head MH1 is attached to the flexible member 51 so that the foregoing longitudinal direction of the flexible member approximately agrees with the stack direction of the layers 21, 23, 25, 27 in the MR element 7. The thin film magnetic head MH1 is a functional device with the nonmagnetic substrate 1 as a slider, and the slider 1 has a recess groove 53 extending along the stack direction of the layers 21, 23, 25, and 27 in the MR element 7. This recess groove 53 defines the aerodynamic property during floatation of the thin film magnetic head MH1.

The flexible member 51 with the thin film magnetic head MH1 attached thereto will be bent in the thickness direction by a force exerted on the thin film magnetic head MH1. The stack direction of the layers 21, 23, 25, 27 in the MR element 7 (the longitudinal direction of the flexible member 51) is approximately coincident with the circumferential direction of a track consisting of a series of magnetization transition areas in a recording medium.

The following will describe a storage device HD using the above-stated thin film magnetic head MH1–MH3 (thin film magnetic head assembly HGA).

Figure 5:
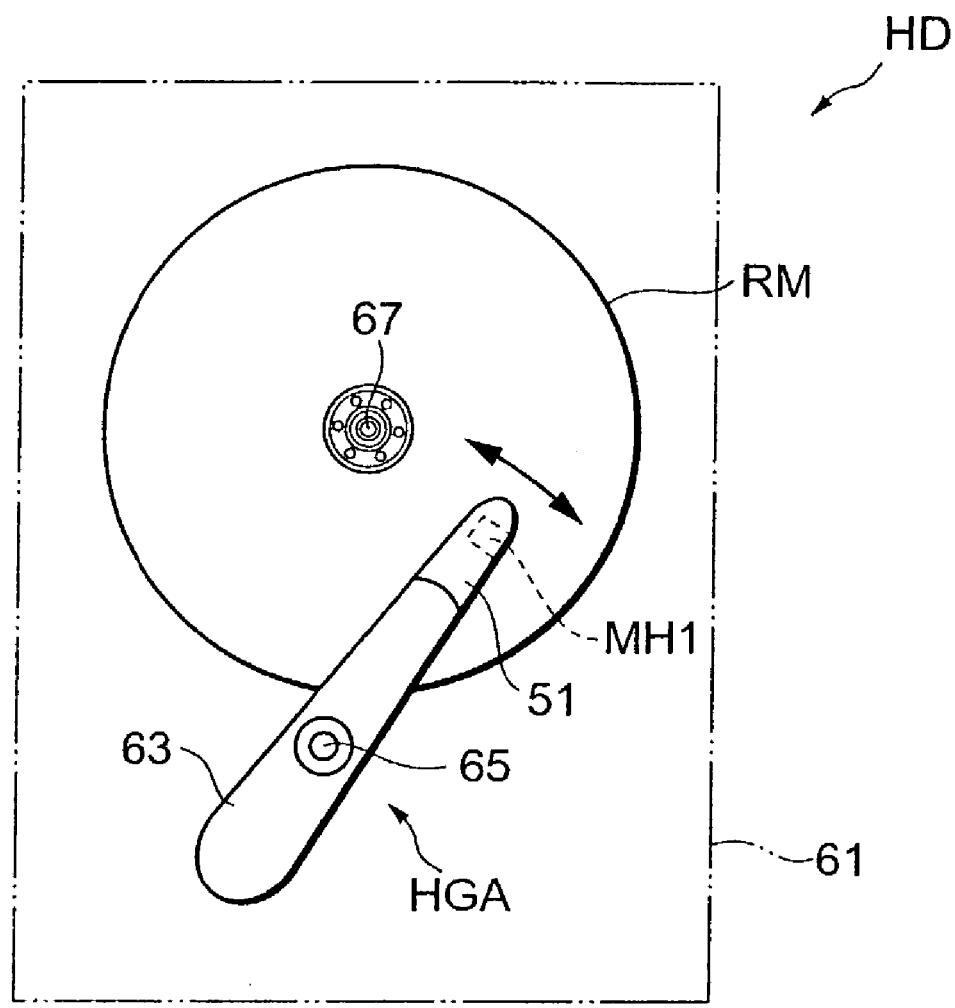
FIG. 5 is a plan view of the storage device using the thin film magnetic head assembly shown in FIG. 4.

FIG. 5 is a plan view of the storage device HD. The storage device HD has a housing 61. Inside the housing 61 a magnetic recording medium RM is placed in addition to the thin film magnetic head assembly HGA having the thin film magnetic head MH1. The thin film magnetic head assembly HGA is a head gimbal assembly having an arm 63 to which one longitudinal end of the flexible member 51 is secured. While the arm 63 rotates about a rotational shaft 65 provided near the central region, the thin film magnetic head MH1 moves along the radial direction of the magnetic recording medium RM. The magnetic recording medium RM is of disk shape and has a track consisting of a series of magnetization transition areas along its circumferential direction. While the magnetic recording medium is rotated about a rotational shaft 67 provided at the center of the disk, the magnetization transition areas move relative to the thin film magnetic head MH1.

The thin film magnetic head MH1 (MR element 7) is located so that a surface parallel to the stack direction of the layers 21, 23, 25, 27 in the MR element 7 faces the magnetic recording medium RM, and is able to detect leakage magnetic fields from the magnetization transition areas of the magnetic recording medium RM. The surface parallel to the stack direction of the layers 21, 23, 25, 27 in the MR element 7 serves as an air bearing surface ABS. Methods available for recording into the magnetic recording medium RM include the longitudinal magnetic recording method, the perpendicular magnetic recording method, and so on.

As described above, since the above thin film magnetic head assembly HGA and the storage device HD employ one of the thin film magnetic heads MH1 to MH3 of the first to the third embodiments as the thin film magnetic head, it is feasible to decrease the read blur in the ambilateral regions of the free layer 27 to suppress the expansion of the effective track width. When either of the thin film magnetic heads MH2, MH3 of the second and third embodiments is used as the thin film magnetic head, it is feasible to properly detect the magnetic field leaking from the magnetic recording medium RM at the free layer 27 in the track part to stabilize the reproduced output.

The following will describe production methods of the thin film magnetic head, particularly, production methods of the MR element and layer structures included in the thin film magnetic head, with reference to FIGS. 6A to 6E and FIGS. 7A to 7E. In the following description, the thin film magnetic head employed is the one of the configuration corresponding to the thin film magnetic head MH2 of the second embodiment. FIGS. 6A to 6E and FIGS. 7A to 7E are schematic illustrations for explaining the production methods of the MR element and layer structures included in the thin film magnetic head.

An example of the production method of the MR element and layer structures included in the thin film magnetic head will be described below on the basis of FIGS. 6A to 6E.

Figure 6A:
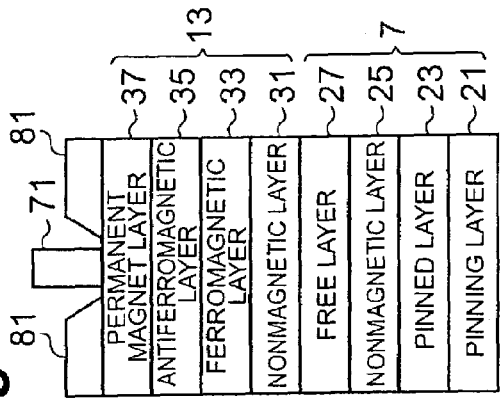
FIG. 6A is an illustration for explaining a production method of the MR element and layer structures included in the thin film magnetic head.

First, as shown in FIG. 6A, each of the layers 21, 23, 25, 27, 31, 33, 35, and 37 is deposited in order up to the specified thickness, thereby forming the MR element 7 and the layer structure 13. The layer structure 13 is formed on the MR element 7. A sputtering method can be employed as a method of forming each of the layers 21, 23, 25, 27, 31, 33, 35, and 37.

Figure 6B:
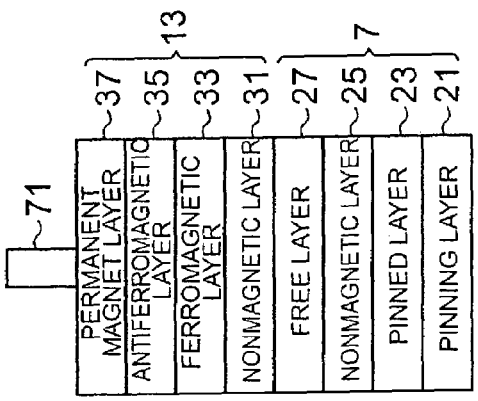
FIG. 6B is an illustration for explaining a production method of the MR element and layer structures included in the thin film magnetic head.

Subsequently, as shown in FIG. 6B, a resist layer 71 is formed in a desired pattern on the layer structure 13 (permanent magnet layer 37) formed by the above step. A photolithography process can be applied to the formation of the resist layer 71.

Figure 6C:
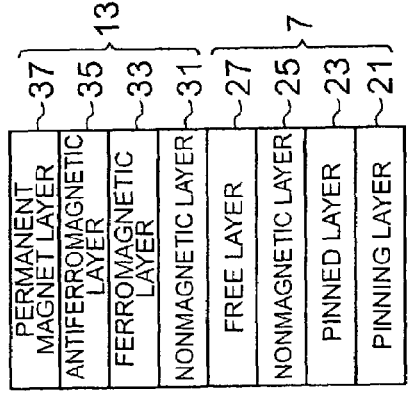
FIG. 6C is an illustration for explaining a production method of the MR element and layer structures included in the thin film magnetic head.

Then, as shown in FIG. 6C, metal layers 81 are formed on the layer structure 13 (permanent magnet layer 37), using the resist layer 71 formed by the above step, as a mask. The metal layers 81 can be formed by a sputtering method using the raw material of Ta, TiW, Mo, or the like.

Figure 6E:
FIG. 6E is an illustration for explaining a production method of the MR element and layer structures included in the thin film magnetic head.
Figure 6D:
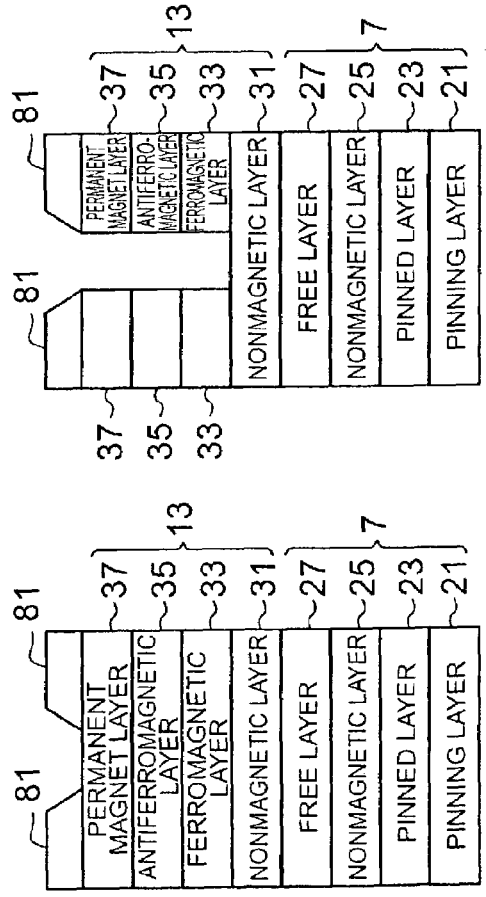
FIG. 6D is an illustration for explaining a production method of the MR element and layer structures included in the thin film magnetic head.

Next, as shown in FIG. 6D, the resist layer 71 is removed (lifted off). This results in exposing a portion of the surface of the layer structure 13 (permanent magnet layer 37).

Thereafter, as shown in FIG. 6E, the exposed region is removed along the in-depth direction from the surface side down to the surface of the nonmagnetic layer 31, using the metals layers 81 formed by the above step, as a mask, while leaving the ferromagnetic layers 33, the antiferromagnetic layers 35, and the permanent magnet layers 37 in the regions masked by the metal layers 81. The spacing between the left portions becomes the optical track width. The above removal can be implemented by RIE.

According to the production method shown in FIGS. 6A to 6E, as described above, the free layer 27 is formed including the portions with the layer structures 13 (ferromagnetic layers 33, antiferromagnetic layers 35, and permanent magnet layers 37) and the portion without the layer structures 13 (ferromagnetic layers 33, antiferromagnetic layers 35, and permanent magnet layers 37). With application of an external magnetic field, the magnetization of the portions with the layer structures 13 (ferromagnetic layers 33, antiferromagnetic layers 35, and permanent magnet layers 37) in the free layer 27 is oriented in the direction opposite to the magnetization of the portion without the layer structures 13 (ferromagnetic layers 33, antiferromagnetic layers 35, and permanent magnet layers 37) in the free layer 27 (the portion equivalent to the track part of the free layer 27). This makes it feasible to decrease the read blur in the portions with the layer structures 13 (ferromagnetic layers 33, antiferromagnetic layers 35, and permanent magnet layers 37) in the free layer 27 and thus suppress the expansion of the effective track width. Since part of the layer structure 13 is removed so as to leave the nonmagnetic layer 31, it is also feasible to protect the free layer 27 by the nonmagnetic layer 31.

In the production method shown in FIGS. 6A to 6E, the permanent magnet layer 37 is further laid on the antiferromagnetic layer 35, on the occasion of carrying out the step of forming the layer structure 13. This permits simple and easy realization of the configuration capable of forming a closed magnetic field together with the ferromagnetic layer 33 included in the layer structure 13.

The following will describe another example of the production method of the MR element and layer structures included in the thin film magnetic head on the basis of FIGS. 7A to 7E.

Figure 7A:
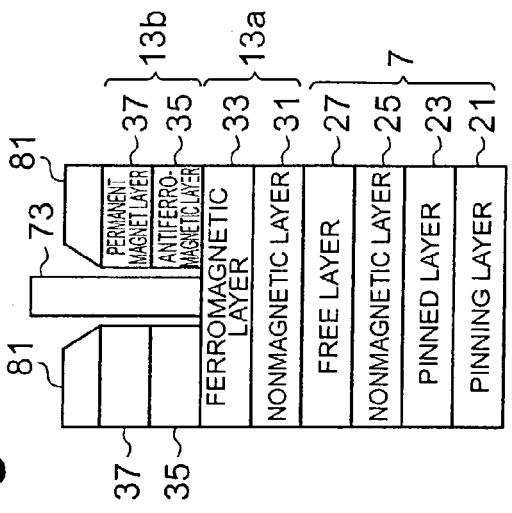
FIG. 7A is an illustration for explaining another production method of the MR element and layer structures included in the thin film magnetic head.

First, as shown in FIG. 7A, each of the layers 21, 23, 25, 27, 31, and 33 is deposited in order up to the specified thickness, thereby forming the MR element 7 and the first layer structure 13a. The first layer structure 13a is formed on the MR element 7. The sputtering method can be employed as a method of forming each of the layers 21, 23, 25, 27, 31, and 33.

Figure 7B:
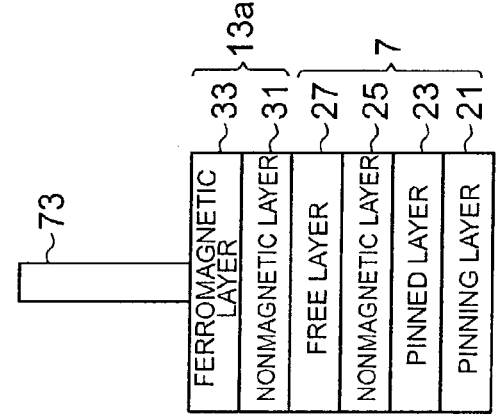
FIG. 7B is an illustration for explaining another production method of the MR element and layer structures included in the thin film magnetic head.

Subsequently, as shown in FIG. 7B, a resist layer 73 is formed in a desired pattern on the first layer structure 13a (ferromagnetic layer 33) formed by the above step. The photolithography process can be applied to the formation of the resist layer 73.

Figure 7C:
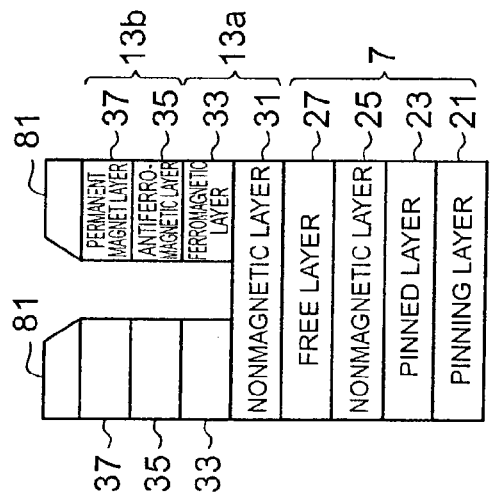
FIG. 7C is an illustration for explaining another production method of the MR element and layer structures included in the thin film magnetic head.

Next, as shown in FIG. 7C, each of the layers 35, 37 is deposited in order up to the specified thickness on the first layer structure 13a (ferromagnetic layer 33), using the resist layer 73 formed by the above step, as a mask, to form the second layer structures 13b. The sputtering method can be employed as a method of forming each of the layers 35, 37. Subsequently, as shown in FIG. 7C, metal layers 81 are formed on the second layer structures 13b (permanent magnet layers 37), using the resist layer 71 as a mask. The metal layers 81 can be formed by the sputtering method using the raw material of Ta, TiW, Mo, or the like, as described above.

Figure 7D:
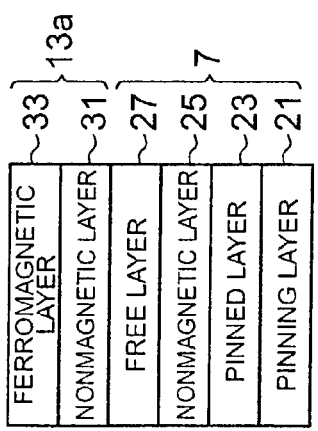
FIG. 7D is an illustration for explaining another production method of the MR element and layer structures included in the thin film magnetic head.

Then, as shown in FIG. 7D, the resist layer 73 is removed (lifted off). This results in exposing a portion of the surface of the first layer structure 13a (ferromagnetic layer 33).

Figure 7E:
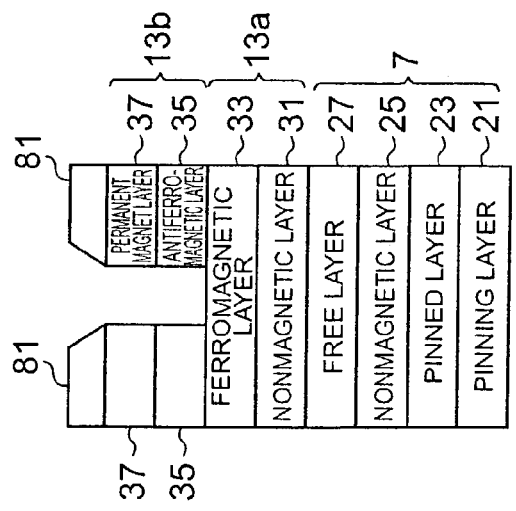
FIG. 7E is an illustration for explaining another production method of the MR element and layer structures included in the thin film magnetic head.

Thereafter, as shown in FIG. 7E, the exposed portion is removed along the in-depth direction from the surface side down to the surface of the nonmagnetic layer 31, using the metal layers 81 formed by the above step, as a mask, while leaving the ferromagnetic layers 33, antiferromagnetic layers 35, and permanent magnet layers 37 in the regions masked by the metal layers 81. The spacing between the left portions becomes the optical track width. The first layer structure 13a and the second layer structure 13b constitute a layer structure 13. The above removal can be implemented by RIE.

According to the production method shown in FIGS. 7A to 7E, as described above, the free layer 27 is formed including the portions with the first and second layer structures 13a, 13b (ferromagnetic layers 33, antiferromagnetic layers 35, and permanent magnet layers 37) and the portion without the first and second layer structures 13a, 13b (ferromagnetic layers 33, antiferromagnetic layers 35, and permanent magnet layers 37). With application of an external magnetic field, the magnetization of the portions with the first and second layer structures 13a, 13b (ferromagnetic layers 33, antiferromagnetic layers 35, and permanent magnet layers 37) in the free layer 27 is oriented in the direction opposite to the magnetization of the portion without the first and second layer structures 13a, 13b (ferromagnetic layers 33, antiferromagnetic layers 35, and permanent magnet layers 37) in the free layer 27 (the portion equivalent to the track part of the free layer 27). This makes it feasible to decrease the read blur in the portions with the first and second layer structures 13a, 13b (ferromagnetic layers 33, antiferromagnetic layers 35, and permanent magnet layers 37) in the free layer 27 to suppress the expansion of the effective track width. Since the ferromagnetic layer 33 is removed so as to leave the nonmagnetic layer 31, it is also feasible to protect the free layer 27 by the nonmagnetic layer 31.

In the production method shown in FIGS. 7A to 7E, the permanent magnet layer 37 is further laid on the antiferromagnetic layer 35, on the occasion of carrying out the step of forming the second layer structures 13b. This permits simple and easy realization of the configuration capable of forming a closed magnetic field together with the ferromagnetic layer 33 included in the first layer structure 13a.

The present invention is by no means intended to be limited to the above-stated embodiments. For example, the structure of each layer does not have to be made of a single material, but each layer may be made of a plurality of materials as long as it can exhibit the specified function as a whole; for example, each layer may be made of an alloy as a mixture of materials, or of a combination of layer structures. An additional layer may be interposed between these layers.

In the embodiments the thin film magnetic head MH1–MH3 is composed of the magnetic detector element MD as a reproducing head and the magnetic field forming element RD as a recording head, but the thin film magnetic head can be one provided with only the magnetic detector element MD.

The above production methods of the MR element and layer structures included in the thin film magnetic head described the examples of application wherein the thin film magnetic head was the configuration corresponding to the thin film magnetic head MH2 of the second embodiment, but they can also be applied to the configurations corresponding to the thin film magnetic heads MH1, 3 of the first and third embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A thin film magnetic head, comprising:
   a magnetoresistive element incorporating a free layer an orientation of magnetization of which varies according to an external magnetic field, and a pair of electrode layers placed so as to overlap with said free layer on both sides of said free layer and be spaced from each other, for supplying an electric current to said magnetoresistive element,
   said thin film magnetic head comprising a layer structure placed between a portion overlapping with said electrode layer in each of ambilateral regions of said free layer, and said electrode layer,
   wherein said layer structure comprises:
   an electrically conductive, ferromagnetic layer a direction of magnetization of which is fixed;
   an electrically conductive, nonmagnetic layer placed between said ferromagnetic layer and said free layer; and
   an electrically conductive, antiferromagnetic layer placed between said ferromagnetic layer and said electrode layer and fixing the direction of magnetization of said ferromagnetic layer,
   wherein a magnetic thickness of said ferromagnetic layer is set greater than a magnetic thickness of said free layer, and
   wherein said layer structure further comprises a fixed magnetization layer placed between said antiferromagnetic layer and said electrode layer and a direction of magnetization of which is fixed in a direction opposite to the direction of magnetization of said ferromagnetic layer.

2. A thin film magnetic head according to claim 1, wherein said free layer and said ferromagnetic layer are made of a common material and a thickness of said ferromagnetic layer is set greater than a thickness of said free layer.

3. A storage device comprising a magnetic recording medium for magnetically storing a signal, and the thin film magnetic head as set forth in claim 1, for converting a change of a magnetic field leaking from said magnetic recording medium, into an electric signal.

4. A thin film magnetic head according to claim 1, wherein said fixed magnetization layer includes a permanent magnet layer.

5. A thin film magnetic head according to claim 1, wherein said fixed magnetization layer includes an electrically conductive, ferromagnetic layer a direction of magnetization of which is fixed, and
   wherein said layer structure further comprises an electrically conductive, antiferromagnetic layer placed between said ferromagnetic layer included in said fixed magnetization layer, and said electrode layer and fixing the direction of magnetization of said ferromagnetic layer included in said fixed magnetization layer.

6. A thin film magnetic head assembly comprising the thin film magnetic head as set forth in claim 1, and a flexible member to which said thin film magnetic head is attached.

* * * * *